UNITED STATES PATENT OFFICE.

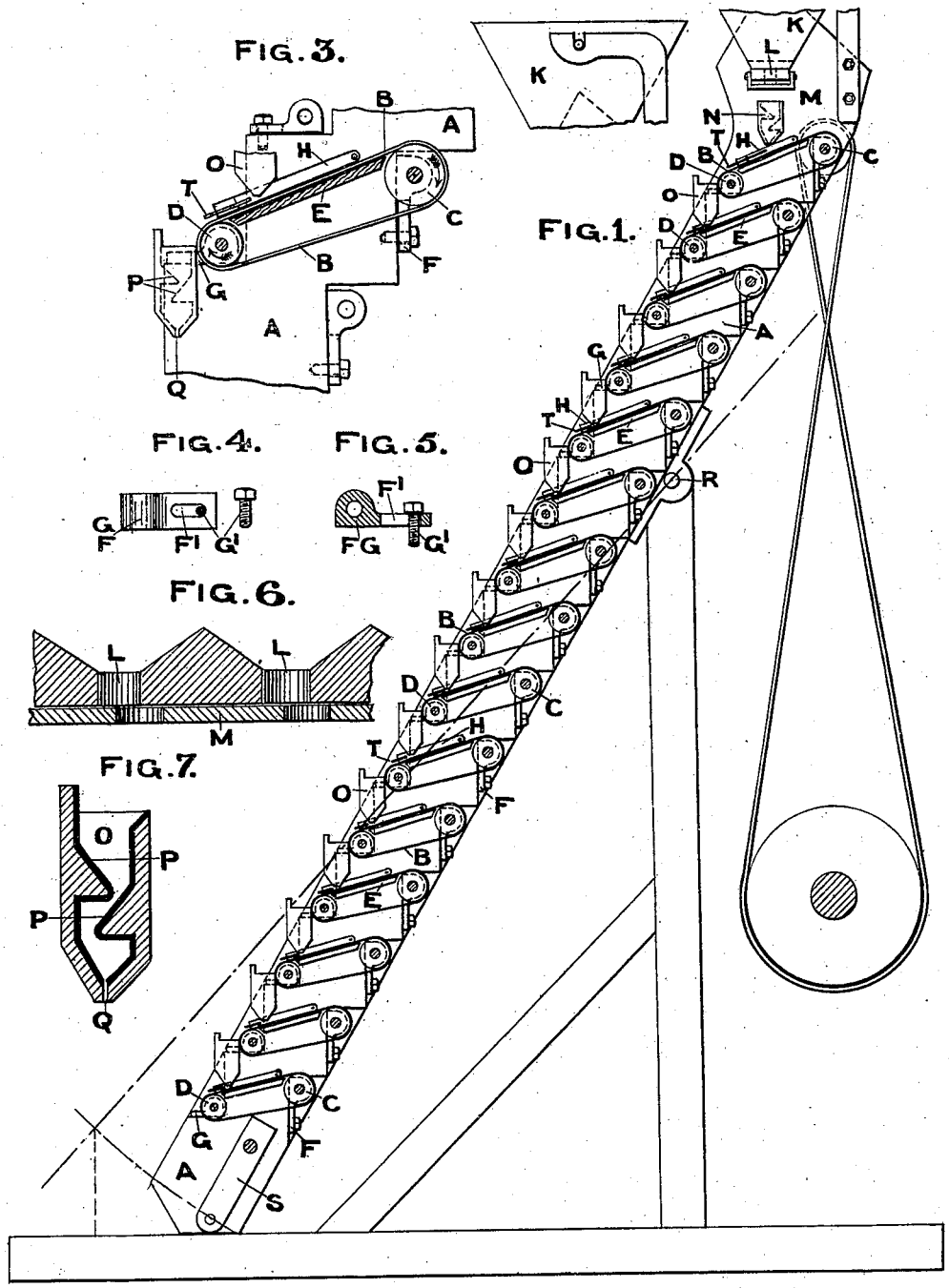

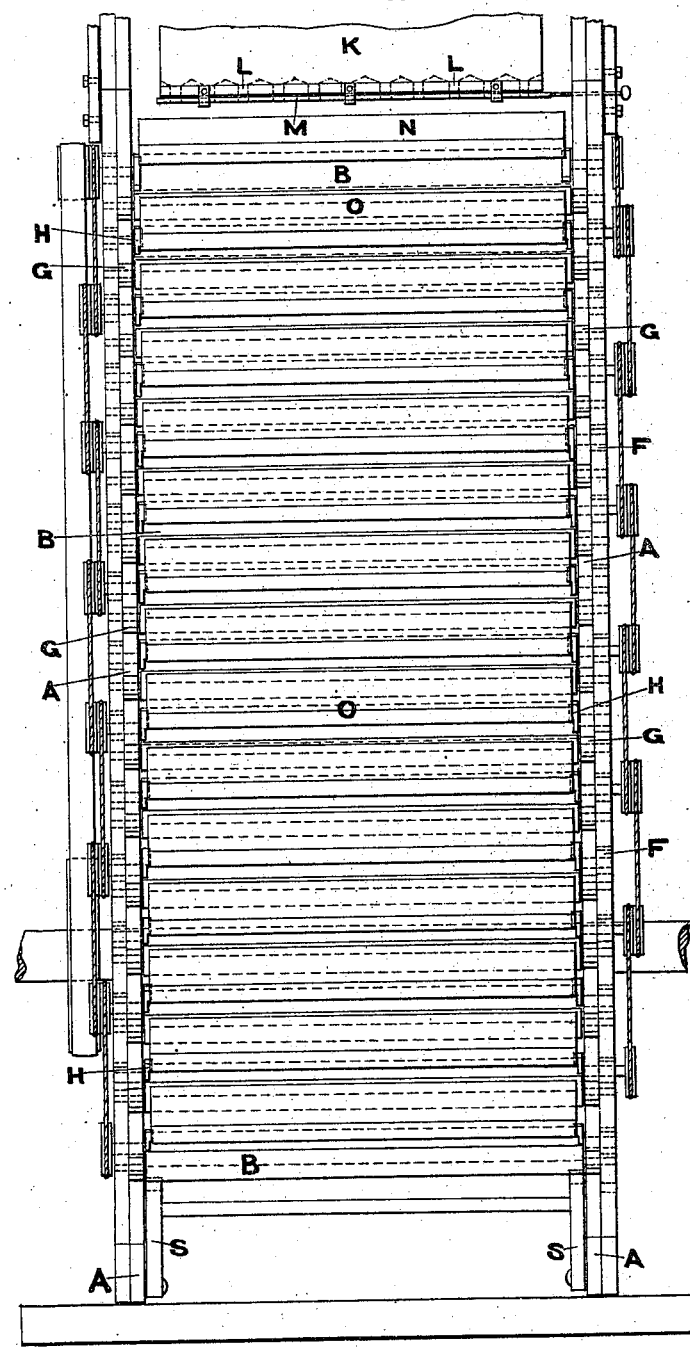

FREDERICK MALCOLM DOSSOR, OF DONCASTER, ENGLAND.

APPARATUS FOR CLEANING AND SEPARATING SEEDS, &c.

No. 846,915.　　　　Specification of Letters Patent.　　　Patented March 12, 1907.

Application filed June 11, 1906. Serial No. 321,245.

*To all whom it may concern:*

Be it known that I, FREDERICK MALCOLM DOSSOR, a subject of the King of Great Britain and Ireland, residing at Doncaster, in the county of York, England, have invented a new and useful Improvement in Apparatus for Cleaning and Separating Seeds and the Like, of which the following is a specification.

This invention relates to certain improvements in apparatus for the purpose of cleaning seeds and grain by the separation or extraction therefrom of docks, rib-grass, or other weeds, light seeds, or foreign matter, my said improvements consisting in treating the seeds by passing them over and through a series of endless traveling belts and hoppers constructed and arranged as hereinafter described.

*Description of Drawings.*

Figure 1 is a side elevation of my improved seed-separating apparatus. Fig. 2 is a front elevation of same. Fig. 3 is an enlarged section of one of the traveling belts or bands. Figs. 4 and 5 show plan and elevation of adjustable bearings, hereinafter referred to. Fig. 6 is an enlarged longitudinal section of part of the upper feed-hopper, showing method of regulating the feed. Fig. 7 is an enlarged section of the velvet-lined guide-hoppers, hereinafter referred to.

Similar letters of reference are employed to indicate corresponding parts throughout the several views.

According to my said invention I arrange upon a suitable frame A a series of endless belts or bands B, preferably composed of velvet, velveteen, or like fabric, which are arranged at a suitable slight inclination in a continuous descending series, each belt or section overlapping the next lower section to a distance of approximately half its length and being driven in an upward direction by suitable gearing from any convenient motor. The belts or bands B are carried on suitable rollers, the upper or driving rollers C being preferably of larger diameter than the lower rollers D and the upper or working portion of each belt B passing over a correspondingly-inclined board E, the top of which is arranged in line with the tops of the rollers C D, thereby preventing any sagging of the belt. Each belt or section is provided with adjustable bearings F G (shown enlarged in Figs. 4 and 5) and is preferably adjustable in the lower rollers D, and the belt may also be provided with side bearings or guides H, movable upon pins or pivots, forming raised edges or guides to prevent the seed from getting between the belt B and its supporting-board E, and to prevent any jumping of the seeds a cover T is provided over each belt, sufficient space being allowed between the cover and the belt for the passage of the seed. The bearings F and G are secured to the frame A by means of bolts G', as shown in Fig. 3. These bolts are screwed into the frame, and the bearings are provided with slots F', so that they may be slid into any desired position before the bolts are screwed up.

The seed or grain is fed to the upper section of the machine by means of two feed-hoppers, consisting of an upper V-shaped hopper K, having circular feed-openings L, and regulating-slide M, Fig. 6, which discharges into a lower V-shaped hopper N, of wood, zinc, or other suitable material, preferably lined with velvet or like fabric, terminating in a fine discharge-slit extending the entire width of the hopper. By this means the seed is fed to the belt in a single line extending across the width of the belt, the distribution of seed being therefore perfectly even and regular throughout the entire width of the belt. The seed, therefore, on coming into contact with the belt is at once separated, the comparatively light and irregular-shaped dock-seed or other foreign matter passing upward with the belt and being immediately discharged over the top at the back of the machine into any suitable receptacle, while the heavier and more rounded clover or grain passes down to the lower end of the belt, where it is delivered over the fixed vertical side of a velvet-lined V-shaped hopper O, Fig. 7, with receiving-inclines P for checking the fall of the seed and with fine discharge-slit Q, which again distributes the seed or grain singly and evenly throughout the entire width of the next lower belt or section, and so on throughout the entire series of belts, bands, or sections, each belt and guide-hopper performing exactly the same work throughout the series.

The middle part of the frame A is supported by a pivot R, so that the frame can be tilted to simultaneously adjust the inclination of all the belts B, instead of having to adjust each one separately by means of its adjusting-leg F. In this manner all the belts can be adjusted without interfering with the separate adjustments of the legs F. The rough material with which the hoppers are lined catches the bearded seeds, such as wild oats, and these bearded seeds are removed from the hoppers periodically before the hoppers become choked up. The rough material or pile fabric P also prevents the small seeds from rebounding out of the hopper, and it prevents them from being injured, which they would be if they fell upon a hard surface. The proposed speed of the rollers C and D when operating upon clover-seed is about three hundred revolutions per minute.

The angle of the frame A of the machine, and consequently the incline of the belts or bands B, may be varied and adjusted upon the pivot R by means of the extensions or feet S, as indicated by dotted lines in Fig. 1, or by any other convenient means, so as to suit the nature of the seed being operated upon.

The number of belts B, guide-hoppers O, and feed-hoppers K N may be varied as desired, and the whole of the guide-hoppers O and also the lower feed-hopper N are preferably lined with velvet or other suitable fabric.

By the above means the seed or grain is carefully passed over and through the required series of belts and hoppers practically without jar, vibration, jumping, or injury, and thereby each grain of weed-seed or other foreign matter is removed and the whole of the sound seed separated and extracted.

I claim—

1. In a seed-cleaning apparatus, the combination, with a series of inclined endless belts or aprons of rough fabric, arranged in the form of steps, and means for driving the said belts upwardly and rearwardly; of a series of hoppers arranged at the front and lower ends of the said belts, said hoppers being provided internally with inclined projections covered with rough fabric.

2. In seed-cleaning apparatus, the combination, with a support, a frame having its middle part pivoted to the said support, and means for holding the said frame at various inclinations; of a series of inclined endless belts or aprons of rough fabric mounted in the said frame and arranged in the form of steps, means for driving the said belts upwardly and rearwardly, and a series of hoppers supported by the said frame and arranged at the front and lower ends of the said belts, said hoppers being provided with inclined projections internally which are covered with rough fabric.

FREDERICK MALCOLM DOSSOR.

Witnesses:
JOHN E. WALSH,
ALLAN BENNETT.